Figure 1:
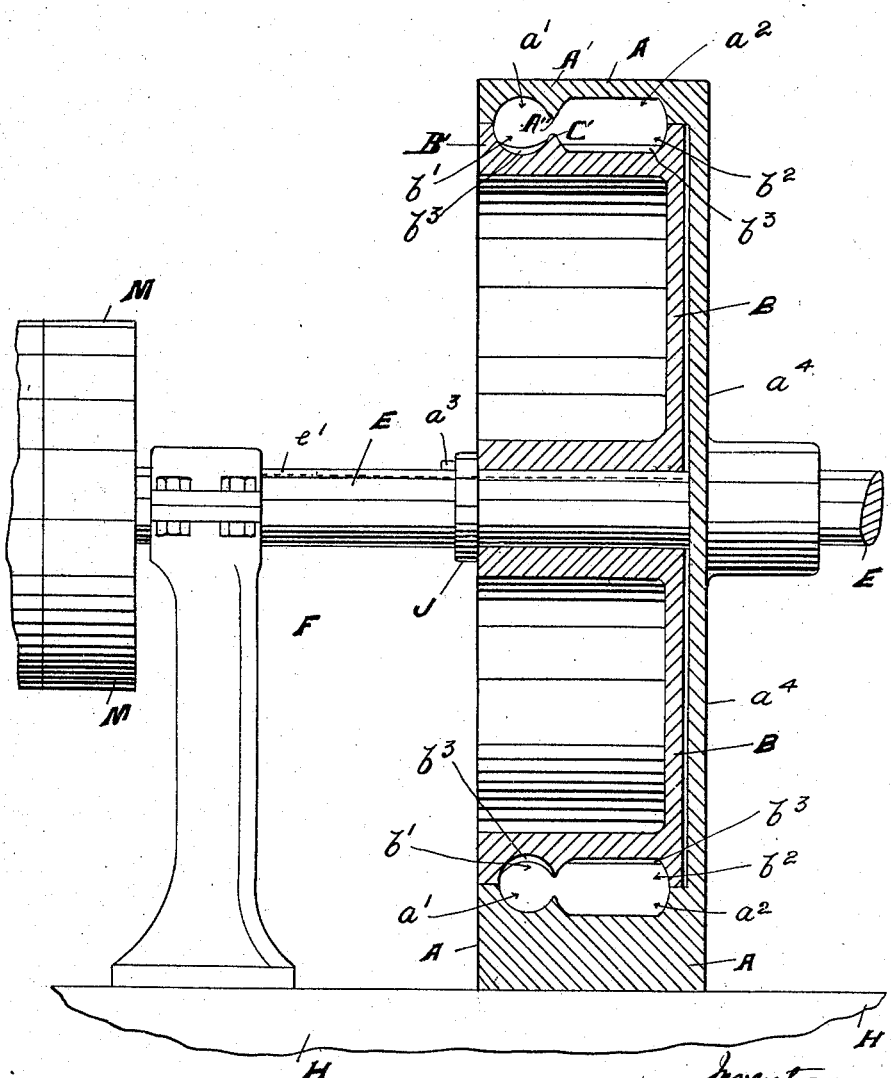

No. 814,274. PATENTED MAR. 6, 1906.
G. F. CHUTTER.
MACHINE FOR MOLDING DOUGH OR OTHER PLASTIC MATERIAL.
APPLICATION FILED MAY 16, 1903.

2 SHEETS—SHEET 1.

No. 814,274. PATENTED MAR. 6, 1906.
G. F. CHUTTER.
MACHINE FOR MOLDING DOUGH OR OTHER PLASTIC MATERIAL.
APPLICATION FILED MAY 16, 1903.
2 SHEETS—SHEET 2.
FIG. 4.
FIG. 3.
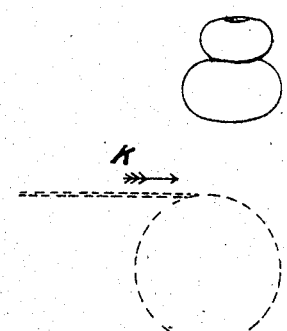
FIG. 2.
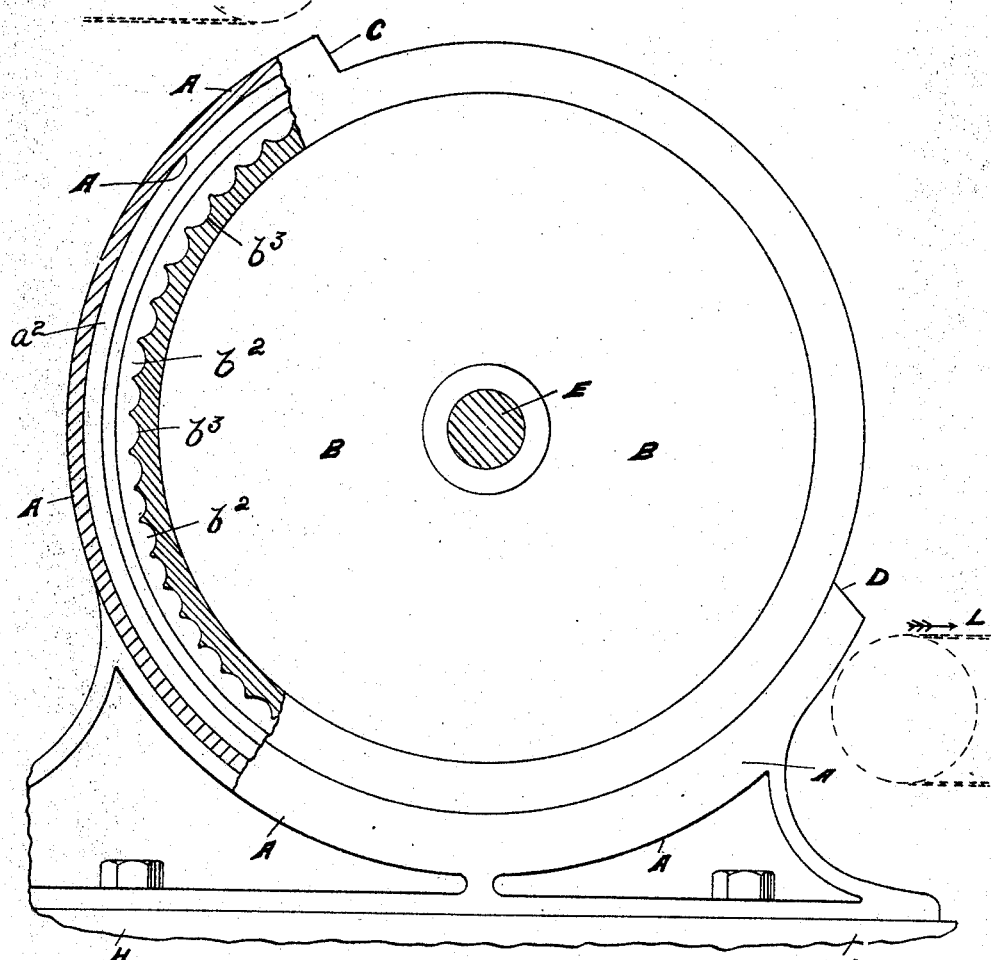
Witnesses:
David F. Moore.
W. F. Crowley.
Inventor:
G. F. Chutter,
by C. H. Riches
Atty.

UNITED STATES PATENT OFFICE.

GEORGE FREDERICK CHUTTER, OF PENARTH, ENGLAND.

MACHINE FOR MOLDING DOUGH OR OTHER PLASTIC MATERIAL.

No. 814,274.  Specification of Letters Patent.  Patented March 6, 1906.

Application filed May 16, 1903. Serial No. 157,397.

*To all whom it may concern:*

Be it known that I, GEORGE FREDERICK CHUTTER, a subject of the King of Great Britain, and a resident of 89 Plymouth road, Penarth, in the county of Glamorgan, England, have invented certain new and useful Improvements in Machines for Molding Dough or other Plastic Material, of which the following is a specification.

This invention relates to a machine for molding dough or other plastic material into the required shape to form cottage or other similar loaves, the object being to produce a machine which reduces the cost of labor, increases the production, and at the same time molds the dough into the required shape in a much more effective manner than hitherto.

In order that this invention may be clearly understood and more easily carried into practice, I have appended hereunto two sheets of drawings, upon which I have illustrated the nature of my said invention.

Figure 1 is a vertical section through one of the machines. Fig. 2 is an elevation of Fig. 1 with a part broken away to show the section. Fig. 3 is a diagram view of the loaf as it leaves the machine. Fig. 4 is a similar view to Fig. 3 of the loaf when finished.

In carrying this invention into effect the annular ring A is fixed to the bed H by any suitable means and is provided upon the inner face of the rim A' with two annular grooves $a'$ $a''$, separated by an annular rib A'' concentric with the center of the ring, while within this ring A is a revoluble disk B, having a rim B' concentric with the rim A' with grooves $b'$ $b''$ upon its outer face similar to those on the inner face of the rim A', separated by an annular rib C' concentric with the center of the disk, the two pairs of grooves when facing each other being of the required size to respectively accommodate the amount of dough required to form the top and bottom of a cottage-loaf. The disk-grooves $b'$ $b^2$ are provided with the lateral flutings $b^3$, while the annular ring A is provided with the entrance or opening C, through which the lump of dough is fed into the machine and rolled and molded in its passage round the grooves to the exit D, from which it is discharged in the form illustrated by Fig. 3, which shape only requires the baker to press down the center of the top to convert it into the well-known form of cottage-loaf illustrated by Fig. 4.

For cleansing the interior of the machine the disk B and shaft E upon which it is fixed are so arranged as to be capable of being moved laterally into the space F at the side, thus permitting the whole of the grooves in the ring A and disk B to be readily cleansed when required, or the disk B may be secured to the shaft E by a key $a^3$ and keyway $e'$, so as to be capable of being moved laterally into the space at F, the collar J being provided for securing the disk when in position for working, as shown by Fig. 1. The annular ring A may be provided on the one side with a casing $a^4$, which may be made to form part of the annular ring-support and which effectively closes the grooves on one side against flour, dust, and the like.

A traveling endless band K may be provided for feeding the lumps of dough into the machine, while a similar endless band L may be arranged to receive the loaves as they leave the machine and prior to being finally pressed by the baker.

It is important for the effective working of the machine that the depth of the grooves $a'$ and $b'$ should be of the same radius from the center of the shaft as the depth of the grooves $a^2$ and $b^2$.

The machine may be driven by power through the pulleys M or may be driven by hand, in which case the speed may be geared up by suitable pinions.

For some shapes of loaves or cakes one groove only is required, while the machine may be arranged with the groove or grooves in a horizontal plane, and the outer grooved ring A may be mounted to revolve, while the inner disk B is fixed, in which case the feed and discharge would be arranged to and from the inner disk.

Having now described my invention, what I claim as new, and desire to secure by Letters Patent, is—

A machine for molding dough and other plastic material comprising a revoluble member having an annular rim, a stationary member having an annular rim concentric with that of the revoluble member, two annular grooves in the adjacent face of each rim disposed in parallel planes and separated by a projecting annular rib, transverse grooves in the rim of the revoluble member crossing the annular grooves therein at an angle thereto and means for causing the rotation of the revoluble member.

In witness whereof I have hereunto set my hand in the presence of two witnesses.

GEORGE FREDERICK CHUTTER.

Witnesses:
LEWIS W. GOULD,
WALTER H. E. BARTLAM.